US010409799B2

(12) United States Patent
Hamedani

(10) Patent No.: US 10,409,799 B2
(45) Date of Patent: Sep. 10, 2019

(54) SUPPORTING UPDATABLE REPEATED VALUES OVER VARIABLE SCHEMA

(71) Applicant: International Business Machines Corporation, Armonk, NY (US)

(72) Inventor: Mohammad S. Hamedani, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 945 days.

(21) Appl. No.: 14/886,684

(22) Filed: Oct. 19, 2015

(65) Prior Publication Data
US 2017/0109392 A1    Apr. 20, 2017

(51) Int. Cl.
| G06F 16/16 | (2019.01) |
| G06F 16/23 | (2019.01) |
| G06F 16/84 | (2019.01) |
| G06F 16/27 | (2019.01) |
| G06F 16/21 | (2019.01) |

(52) U.S. Cl.
CPC .......... *G06F 16/23* (2019.01); *G06F 16/162* (2019.01); *G06F 16/213* (2019.01); *G06F 16/278* (2019.01); *G06F 16/84* (2019.01)

(58) Field of Classification Search
CPC ...................................................... G06F 16/16
See application file for complete search history.

(56) References Cited

U.S. PATENT DOCUMENTS

| 2008/0294863 | A1* | 11/2008 | Faerber | H03M 7/3084 |
| | | | | 711/170 |
| 2010/0235335 | A1* | 9/2010 | Heman | G06F 16/23 |
| | | | | 707/703 |
| 2011/0010330 | A1* | 1/2011 | McCline | G06F 16/2386 |
| | | | | 707/602 |
| 2014/0244602 | A1 | 8/2014 | Rastogi et al. | |
| 2016/0055192 | A1* | 2/2016 | Bensberg | G06F 16/2282 |
| | | | | 707/755 |
| 2017/0075950 | A1* | 3/2017 | Barber | G06F 16/2379 |

FOREIGN PATENT DOCUMENTS

WO    2011126995 A1    10/2011

* cited by examiner

*Primary Examiner* — Apu M Mofiz
*Assistant Examiner* — Farhad Agharahimi
(74) *Attorney, Agent, or Firm* — Rahan Uddin; Ryan, Mason & Lewis, LLP

(57) ABSTRACT

Data within a database is partitioned into one or more sets of read-only data pages and one or more sets of append-only data pages, wherein each set of read-only data pages is associated to one of the one or more sets of append-only data pages. A repeated map is maintained for at least one of the one or more sets of append-only data pages. An operational position map is maintained for at least one of the one or more sets of append-only data pages. A request is received to update one or more records in a given set of read-only pages, wherein at least one of the one or more records comprises repeated values. The repeated map and operational position map of the append-only pages associated with the given set of read-only pages are updated in response to the request. The one or more sets of append-only pages are automatically merged with their respective set of read-only pages on a periodic basis to create one or more new sets of read-only pages.

20 Claims, 10 Drawing Sheets

IN-PAGE REPEATED MAP USING APPEND-ONLY TECHNIQUE

IN-PAGE REPEATED/POSITION MAP REPRESENTATION USING APPEND-ONLY TECHNIQUE

TWO BITS CAN BE ALLOCATED FOR THE OPERATION TYPE:
'00' = NEWLY INSERTED, '01' = UPDATED, '10' = DELETED, AND THE POSITION CAN BE DELTA COMPRESSED

EXAMPLES OF CUMULATIVE CHANGES TO REPEATED VALUE
(USING APPEND-ONLY TECHNIQUE)

IN-PAGE REPEATED/POSITION MAP (USING APPEND-ONLY TECHNIQUE)

TWO BITS CAN BE ALLOCATED FOR THE OPERATION TYPE:
'00' = NEWLY INSERTED, '01' = UPDATED, '10' = DELETED,
AND THE POSITION CAN BE DELTA COMPRESSED

SUPPORTING UPDATABLE REPEATED VALUES OVER VARIABLE SCHEMA

BACKGROUND

Relational databases are digital databases whose organization is based on the relational model of data which organizes data into one or more tables (i.e., "relations") of rows and columns. JavaScript Object Notation (JSON) is a lightweight data-interchange format that allows programmers to store and communicate sets of values, lists, and key-value mappings across systems. Furthermore, JSON documents are particularly useful for data management. As more and more web-based applications exchange and/or store information in JSON format, traditional relational-style databases are beginning to integrate JSON features.

SUMMARY

Embodiments of the invention provide techniques for supporting updatable unbounded unordered repeated values over variable schema.

For example, in one embodiment, a method comprises the following steps. Data within a database is partitioned into one or more sets of read-only data pages and one or more sets of append-only data pages, wherein each set of read-only data pages is associated to one of the one or more sets of append-only data pages. A repeated map is maintained for at least one of the one or more sets of append-only data pages. An operational position map is maintained for at least one of the one or more sets of append-only data pages. A request is received to update one or more records in a given set of read-only pages, wherein at least one of the one or more records comprises repeated values. The repeated map and operational position map of the append-only pages associated with the given set of read-only pages are updated in response to the request. The one or more sets of append-only pages are automatically merged with their respective set of read-only pages on a periodic basis to create one or more new sets of read-only pages.

DETAILED DESCRIPTION

Figure 1:
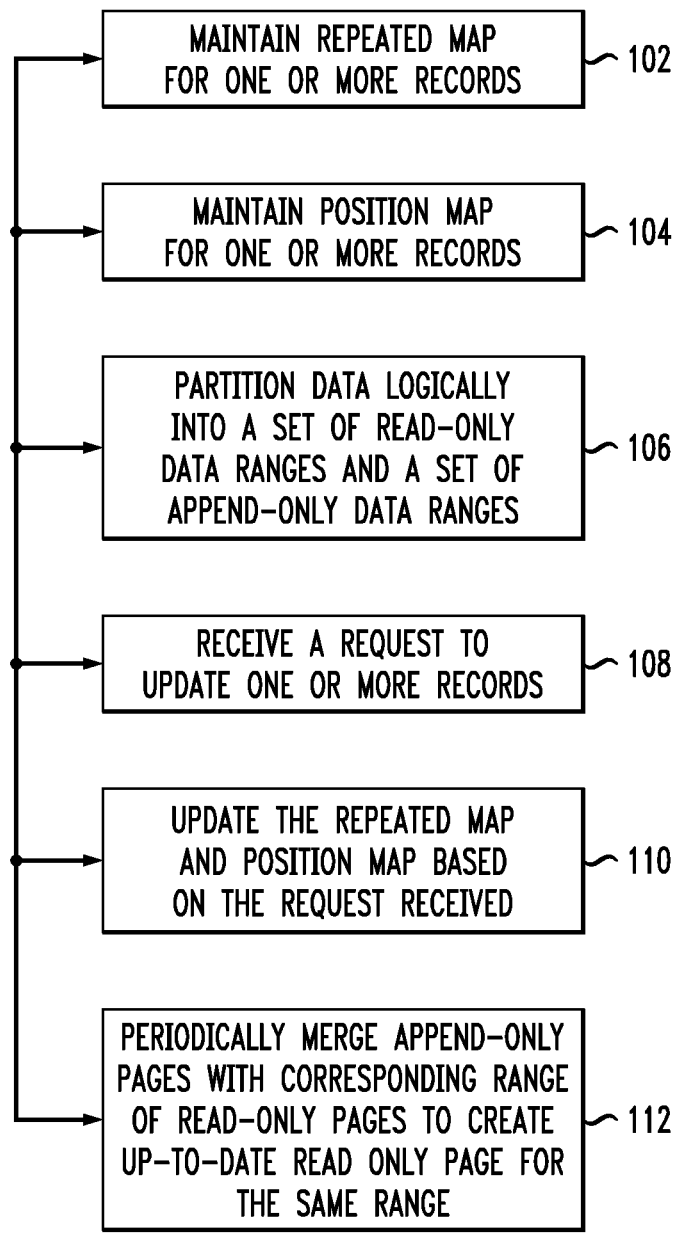
FIG. 1 illustrates an overview process of a methodology for supporting updatable unbounded unordered repeated values over variable schema, according to an embodiment of the invention.

Illustrative embodiments of the invention may be described herein in the context of illustrative methods, systems and devices for database management, more particularly, for supporting updatable repeated values for ordered and unordered values over variable schemas in relational databases. However, it is to be understood that embodiments of the invention are not limited to the illustrative methods, systems and devices but instead are more broadly applicable to other suitable methods, systems and devices.

As traditional relational databases begin to integrate JSON features, certain issues that remain to be addressed include the ability to store repeated values. At present, each cell can hold one value (e.g., an integer or text) or it can hold repeated values (i.e., a set having two or more values) as a binary large object (BLOB) or a coarse representation (CLOB). In order to insert additional values, for example, in the middle of the data structure, everything beneath it would have to be shifted down. However, this type of shifting operation could be computationally expensive. Another issue in relational data is a type of column known as variable size character (varchar) column, which could be in the form of a binary number or a text. As such, the size of the varchar is usually unknown. For a binary number, perhaps the number of bytes it uses may be known, but for characters or text, the size may be unknown as a user may write one sentence or multiple sentences. The unpredictability of the size of varchars remain a challenge because as the varchar grows, everything that comes after it needs to be pushed and shifted to allow it to grow.

The emerging data models such as JSON and property graph demand flexible schema support (e.g., adding/removing columns) and support for extended data types such as order/unordered list of repeated values. Any JSON store must support ordered and unordered list. Similarly, property graph models require flexibility of adding/removing new properties/attributes (e.g., columns) and require an efficient modeling of adding/removing edges (e.g., repeated values data types).

Existing database management tools, such as those listed below, mostly focus on either standard relational data types or focus on analytical read-only engine with extended data types support.

1) In-place update: for example, MangoDB, whose shortcomings include:
   due to repeated values in a record, the record continues to increase, resulting in constant page restructuring and pushing records to new pages;
   both repeated and non-repeated columns are stored contiguously as rows, further increasing the cost of copying; and
   read/write contention and lower/no compression.
2) Append-only updates: for example, Sempala (based on Impala which is based on Google Dremel) and Key-Value stores, whose shortcomings include:
   due to lack of support for repeated values, the entire unchanged portion of the record is copied, and the cost increases proportional to the number of repeated values resulting in both increased footprint and increased time to perform the update operation due to reading/writing of the records.

3) No Update: for example, Google Dremel which supports column-store and includes native support for repeated/nested values, but lacks online transaction processing (OLTP) support and update support and is also limited to read-only scenarios.

Advantageously, various embodiments herein introduce a columnar in-page representation (e.g., record-level independent, where columns are aligned at record-level) to store and access repeated values data types, including varchar, develop append-only technique for updating repeated values and adding/removing columns (e.g., using latch-free and contention-free techniques). Updated repeated values are stored cumulatively as repeated values (append-only), and the updates are periodically merged with base data (using a latch-free technique). After the merge process, the older versions of repeated values can further be groomed to becoming non-cumulative and stored as in-lined and ordered.

Referring to the figures, FIG. 1 depicts an overview process of a methodology 100 for supporting updatable unbounded unordered repeated values over variable schema and reducing the cost associated therewith. Methodology 100 comprises the following steps. At step 102, a repeated map is maintained to distinguish between repeated values (either ordered or unordered) of the same record and values of different records. At step 104, an operational position map is maintained to identify which operation is applied to which ordered value of a particular repeated value column. At step 106, the data is logically partitioned into a set of read-only and append-only data ranges. Each read-only data range is associated to a set of append-only data ranges, an update (or delete) to a read-only range is transformed to an insert of a new record (with only the updated values or updated repeated values) appended to the corresponding append-only data range. At step 108, one or more requests to update one or more records is received. At step 110, the repeated map and position map are updated based on the request received (e.g., based on one or more requested updates for one or more records). Notably, queries may consult read-only pages and, only if necessary, consult their corresponding append-only pages. At step 112, consecutive ranges of committed append-only pages are periodically merged via shadow copy with their corresponding range of read-only pages to create a new set of up-to-date read-only page for the same range. It is to be appreciated that the steps set forth in the context of FIG. 1 may be performed in any suitable order, not necessarily in the ordered described herein.

Figure 2:
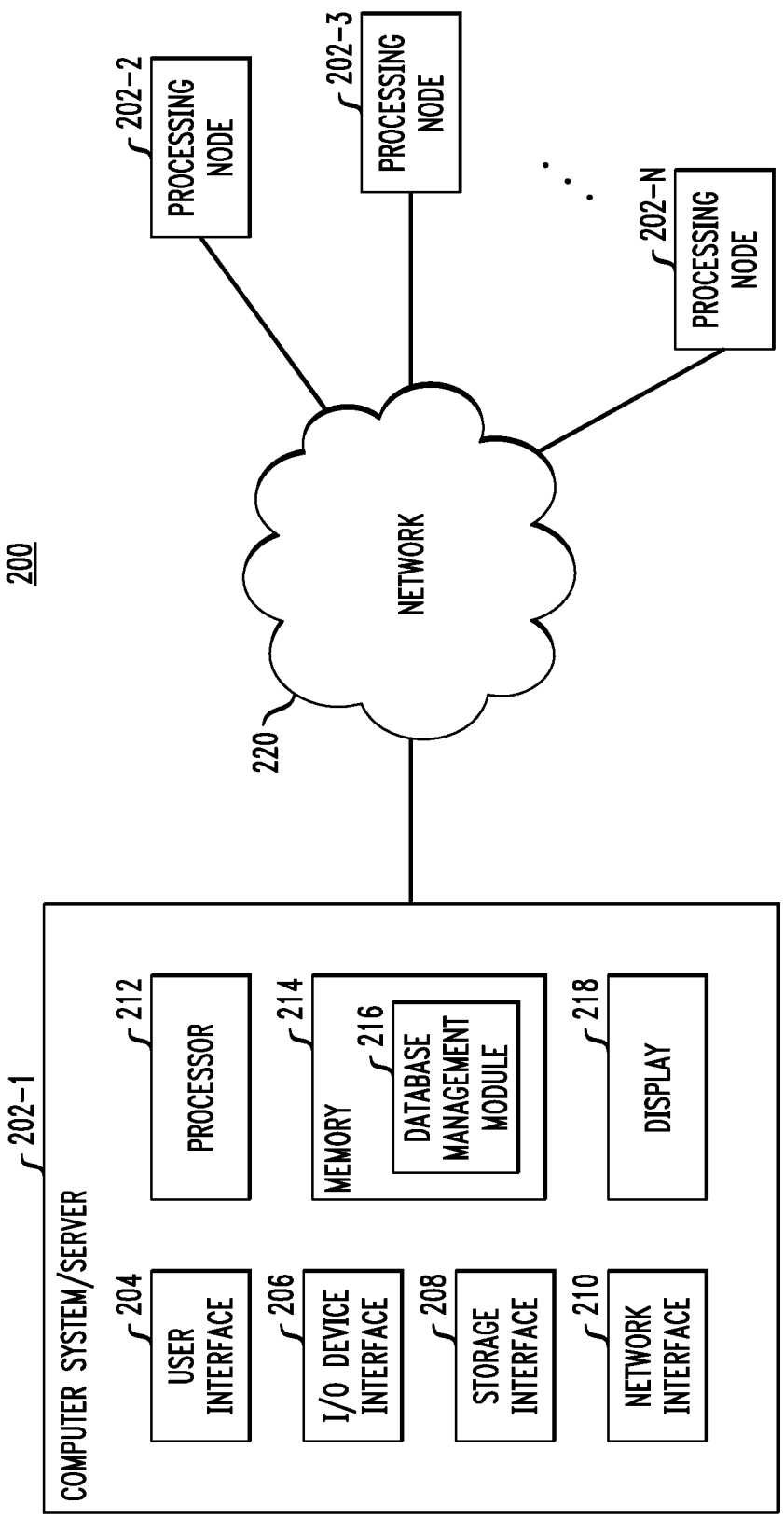
FIG. 2 illustrates an exemplary embodiment of a distributed network 200 in which the methodology 100 of FIG. 1 may be implemented.

FIG. 2 depicts a distributed network 200 for implementing methodology 100 of FIG. 1. Distributed network 200 comprises one or more processing nodes 202-1 . . . 202-N configured for communication through network 220. Each of the processing nodes 202-1 . . . 202-N may be configured with components similar to computer system/server 202-1, which may comprise, but is not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 202-1 may include a user interface 204, an input/output (I/O) device interface 206, a storage interface 208, a network interface 210, one or more processors 212 coupled to a memory 214 and a display 218.

User interface 204 may be configured to enable user input into the computer system/server 202-1. I/O device interface 206 may support communication with a variety of I/O devices. For example, user output devices (such as a video display devices, hand-held devices and computing devices) and user input devices (such as a keyboard, mouse, keypad, touchpad, light pen, or other pointing devices).

The storage interface 208 may support communication with and attachment of one or more disk drives or direct access storage devices, such as rotating magnetic disk drive storage devices and solid-state drives. Network interface 210 may be configured to enable the computer system/server 202-1 to interface with a network 220 and other system components in a distributed network.

Memory 214 may include a random-access semiconductor memory, storage device, or storage medium (either volatile or non-volatile) for storing or encoding data and programs. In another embodiment, the memory 214 represents the entire virtual memory of the computer system/server 202-1, and may also include the virtual memory of other computer systems coupled to computer system/server 202-1 or connected via network 220. The memory 214 may be a single entity, but in other embodiments the memory 214 may include a hierarchy of caches and other memory devices. For example, memory may exist in multiple levels of caches, and these caches may be further divided by function, so that one cache holds instructions while another holds non-instruction data, which is used by the processor. Memory 214 may also comprise a database management module 216 for implementing at least a portion of methodology 100 of FIG. 1, details of which is delineated in the context of FIG. 3.

The display device 208 may be a standalone display screen, computer monitor, television, a tablet or handheld device display, or other suitable displayable device. It is to be appreciated that distributed network 200 may include more or less components than shown in FIG. 2. Furthermore, each of the processing nodes 202-1 . . . 202-N may comprise more or less components than shown in computer system/server 202-1.

Figure 3:
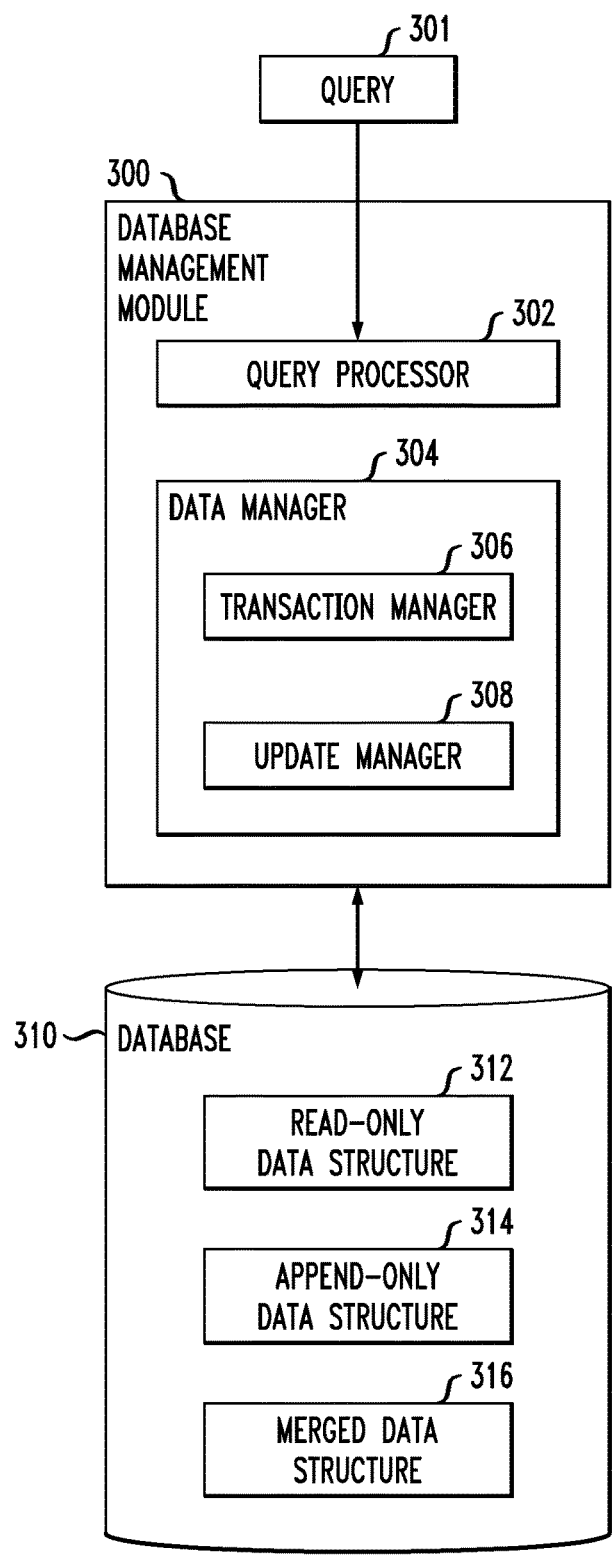
FIG. 3 illustrates an illustrative embodiment of a database management module of FIG. 2.

FIG. 3 depicts an illustrative embodiment of the database management module 216 of FIG. 2. In an embodiment, the database management module 300 may include a query processor 302 and a data manager 304, which may interact with a one or more data structures (e.g., read-only data structure 312, append-only data structure 314, and the merged read-only data structure 316) within a database 310. Database 310 may be any suitable storage device, such as an in-memory database or external database. A data structure as disclosed herein may mean a data page, data table, column of a table, file, index, set of records, or other structure for organizing data. In some embodiments, the read-only data structure 312, the append-only data structure 314, and the merged read-only data structure 316 may be located in the memory 214 of FIG. 2 instead of or in addition to the database 310. Further, the components (e.g., query processor 302 and data manager 304) within the database management module 300 are by way of illustration and therefore there may be more or less components within the database management module 300 as illustrated. As disclosed herein, the term "append-only" may mean that data can only be added, in any order (including out of order) to an append-only data structure, but not removed. Append-only data structures may accordingly include records that are inserted when a request for an update and/or delete is initiated. The term "read-only" may refer to a data structure that cannot be written to.

In various embodiments, these components and data are operable to receive a query request 301 to update and/or delete values located at a read-only location (e.g., column, field, record, etc.) within a data page, insert corresponding records to the append-only data structure 314, and periodically merge committed data values from the append-only data structure 314 (and the read-only data structure 312) to the merged read-only data structure 316, as described in more detail below.

In some embodiments, a user or application may issue an update and/or delete (or snapshot) query request 301 and the database management module 300 may receive the query request 301 to modify one or more values located within the read-only data structure 312. The query request 301 may be written in any suitable query language that corresponds to the database type. For example, the query request may be written in JSON data format for document-oriented databases, structured query language (SQL) for relational databases, data manipulation language (DML) for inserting, updating, or deleting database records in relational databases, multidimensional expression (MDX) for multidimensional or online analytical procession (OLAP) databases, OLTP, or any other language for any other database.

In various embodiments, the data manager 304 may include a transaction manager 306 and an update manager 308. Transaction manager 306 may provide an interface between low level data stored in the database 310 and higher level applications. The transaction manager 306 may interface with the data pages (e.g., data structures 312, 314 and 316) by translating various query requests (e.g., query 301) into low-level file system commands. The transaction manager 306 may also be responsible for coordinating various transactions (also known as commit cycles) within the data structures. A transaction is one or more operations that make up a unit of work performed against a database 310 or memory. For example, a transaction may include the I/O operations of deleting a value, adding a value, and updating a corresponding record with a new value. In various embodiments, a transaction may be in multiple states. If the transaction manager 306 executes all of its operations successfully, which includes successfully performing various checks, then the transaction may be in a committed state. Accordingly, all of the committed transactions may permanently be applied to the data pages within the database 310 or memory. The transaction may also be in a failed state (uncommitted state). In an uncommitted state, some operations may be performed while others are not finished. Uncommitted values may not be merged to the merged read-only data structure 316. In some embodiments, the transaction manager 306 may also be responsible for inserting a first set of records into the append-only data structure 314 in response to a request to update and/or delete particular values, as described in more detail below.

In various embodiments, the update manager 308 is configured to manage updates (e.g., operations such as add, delete, change, new) so as to support transaction and analytics on a single engine that also supports flexible schema and extended data types. For example, supporting repeated values for ordered and unordered lists, efficient varchar representation as repeated values of fixed sizes, and storing repeated values without assigning a new tuple sequence number (TSN) to avoid redundantly storing columns such as schema-encoding, timestamp, indirection, etc. The update manager 308 may be configured to implement at least a portion of FIGS. 4-10 below.

Figure 4:
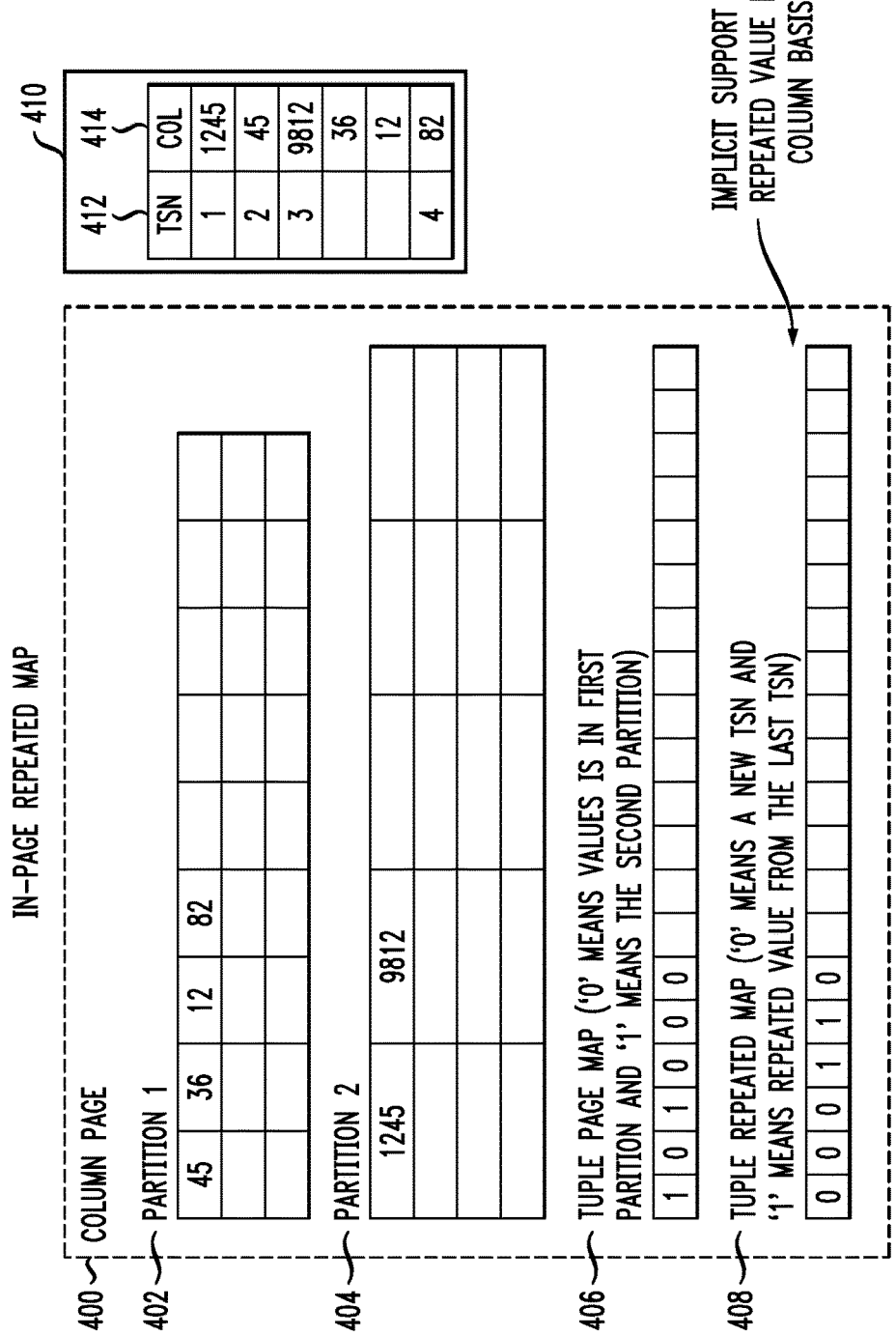
FIG. 4 illustrates an illustrative embodiment of an in-page repeated map, according to an embodiment of the invention.

FIG. 4 depicts an illustrative embodiment of an in-page repeated map. In a database (e.g., database 310 of FIG. 1), each column of a record may be stored separately, and there may be multiple partitions within each page of a column. Multiple partitions may be used as the data in the column is usually compressed such that data can be compressed using various units (e.g., 2 bits, 4 bits, 12 bits, etc.). As shown in column page 400, the first partition 402 comprises all the data that has 2 bits, while the second partition 404 comprises all the data with 4 bits. Each of the first and second partitions 402 and 404 may be organized as a table, each cell of the table comprising a value. It is to be appreciated that while only two partitions are shown, column page 400 may include more or less partitions as needed or desired.

Column page 400 is an in-page repeated map representation of table 410, which comprises TSN 412 and updated Column 414. TSN 1 represents record 1, with the corresponding value 1245 stored as the first value in the updated Column 414. As shown TSN 1 has Column value 1245, TSN 2 has Column value 45, TSN 3 has Column repeated values of 9812, 36, 12, and TSN 4 has Column value 82.

Column page 400 also includes a tuple page map 406 comprising an array of integers, each integer indicating which partition the corresponding value is in. For example, a "0" in the tuple page map 406 indicates that the column value is in the first partition 402 and a "1" indicates that the column value is in the second partition 404. As shown, tuple page map 406 includes string "10100," the first position corresponds to TSN 1, the second position corresponds to TSN 2, etc. As shown, the first position of tuple page map 406 has a "1" which means that the Column value 1245 of TSN 1 is in the second partition 404. Similarly, the second position of tuple page 406 has a "0", which indicates that the Column value 45 of TSN 2 is in the first partition 402. Position 3 of tuple page map 406 has a "1" which indicates Column value 9812 is in the second partition 404, and Column values 36 and 12 of TSN 3 are in the first partition 402 as indicated by positions 4 and 5 of tuple page map 406.

However, in order to distinguish one record from another, an additional mechanism is needed. Advantageously, various embodiments herein provide a tuple repeated map that indicates whether the record is a new TSN or a continuing TSN. As shown, each position of tuple repeated map 408 comprise an integer, for example, a "0" indicates a new TSN and a "1" indicates an ongoing TSN with repeated value from the last TSN. Tuple repeated map 408 has string "000110," the first position corresponds to the TSN 1, second corresponds to TSN 2 and the third corresponds to TSN 3. Note that the fourth position of tuple repeated map 408 has a "1," which means it is a continuation of the last TSN (in this example, TSN 3), the same applies to the fifth position which also contains a "1". The sixth position of tuple repeated map 408 contains a "0," which indicates a new TSN, which is TSN 4 in this example.

In some embodiments, database 310 may include a set of base pages (i.e., read-only pages) and a set of tail pages (i.e., append-only pages). For every column, the base pages are read-only pages. If a user or an application wants to make a change to the original column, for that particular page, a new append-only page is created in which only the deltas to be applied to the original page are stored. Therefore, the base pages are not touched and the deltas are stored in the tail pages. Once the tail pages are filled, periodically, the tail pages are merged with the base pages in order to create one or more consolidated page of recent updates (i.e., merged read-only pages). The read-only pages, append-only pages and merged read-only pages may comprise read only data structure 312, append-only data structure 314 and merged data structure 316 shown in FIG. 3. Various embodiments of the invention may rely on these tail pages (i.e., append-only pages) to store the deltas in order to handle updates for repeated values.

Figure 5:
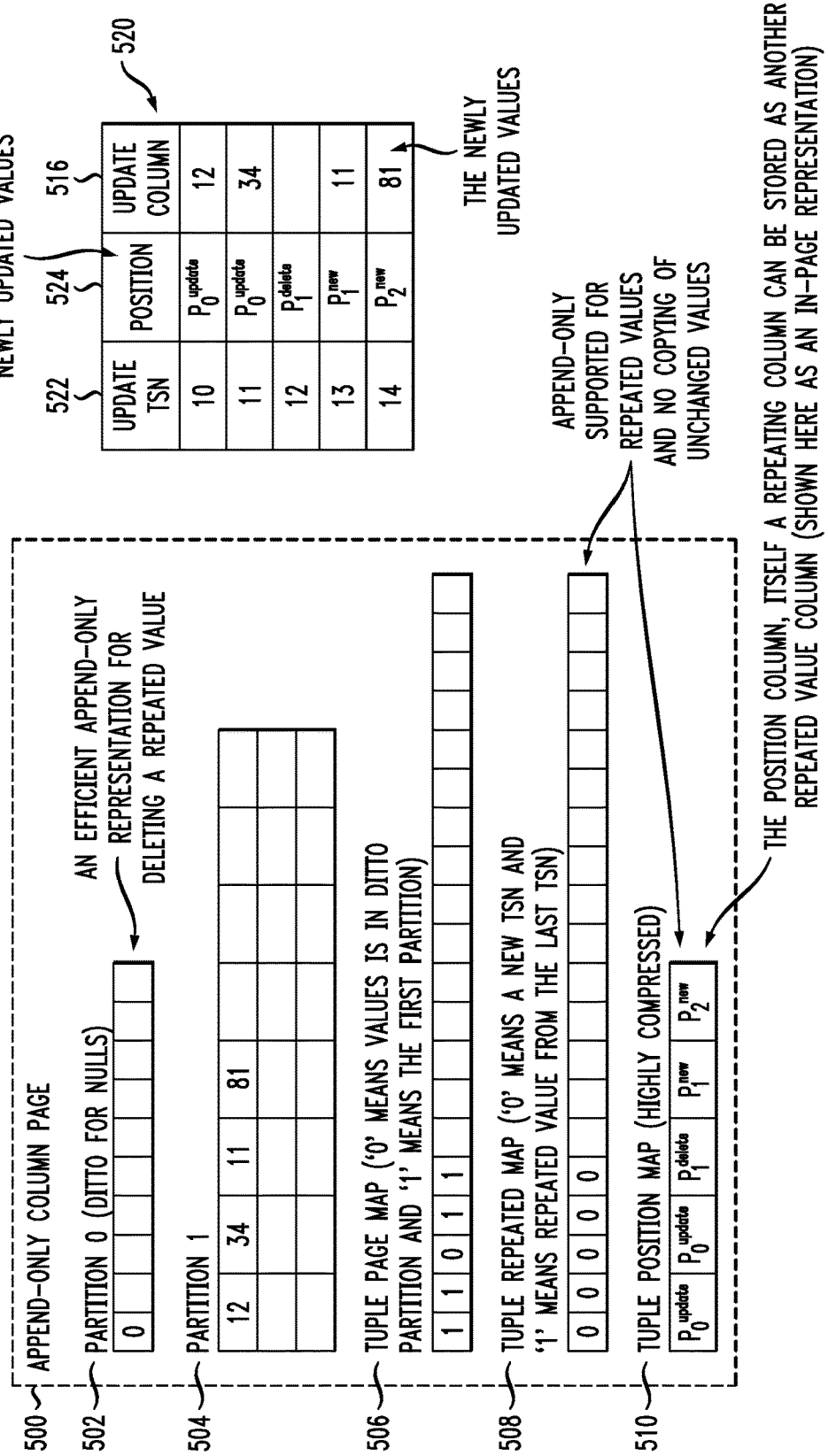
FIG. 5 shows an illustrative embodiment in which repeated values are updated using an append-only technique.

FIG. 5 depicts an illustrative embodiment in which repeated values are updated using an append-only technique. Append-only column page 500 is an in-page repeated/position map representation of table 520. As shown, table 520 comprises an update TSN column 522, a position column 524 and an updated column 526. Table 520 shows TSN 10 with position $P_0^{update}$ and column value 12, which means change the value in position 0 to "12". Table 520 also shows TSN 11 with position $P_0^{update}$ and column value 34, which means change the value in position 0 to value 34. Similarly, TSN 12 has position $P_1^{delete}$, which means delete the value at position 1. TSN 13 has position $P_1^{new}$, which means that at position 1, insert a new value 11. TSN 14 has position $P_2^{new}$ and column value 81, which means insert new value 81 at position 2. To store the append-only columns, the append-only page is used. The append-only column page 500 comprises partition 0 502, partition 1 504, tuple page map 506, tuple repeated map 508 and tuple position map 510. Note that partition (partition 0) 502 is a default partition which is referred to as the "ditto" partition, which is primarily used to store null or deleted values. Advantageously, this provides a much more compressed format since a one bit value is used for each position in the ditto partition. Tuple page map 506 indicates which partition the value is in. The tuple repeated map 508 indicates whether the TSN is a new TSN or a continuing TSN. As used here, a "1" indicates a new TSN and a "0" indicates a continuing TSN with repeated value from the last TSN. For example, for TSN 10 with value 12, it has a corresponding tuple repeated value of "0", which means this is a new TSN. Append-only column page 500 also comprises a third page, the tuple position map 510, which indicates which position was updated and the operation that was performed (e.g., delete, new, update). Each cell of the tuple position map 510 stores two things: 1) position; and 2) a flag using one or two bits to identify an operation (e.g., new insertion, update, delete). Using the position and the flag information in each cell, various embodiments herein enable a system to incrementally perform an append-only process of some or all operations that are happening to one or more repeated values. Advantageously, at any point in time, by looking at this append-only column page, 500, and the corresponding base page, a user or application can construct the latest value of the data snapshot of any record and/or set of records by consolidating the base page and the append-only pages.

As such, various embodiments herein provide a way to support repeated and nested values performing updates using an append-only technique as described herein. Notably, updates could be either updating/removing of a repeated value or inserting/appending a new value. Updates are appended (e.g., based on a tail-page technique described above). Each updated column with repeated values may have position values in an append-only page, either embedded within the page or stored as a separate column. The position data type may also be repeating and includes state bits to distinguish between newly inserted, updated, and deleted values (e.g., '00'=newly inserted, '01'=updated, '10'=deleted). Updates may be cumulative within and across columns, the accumulation may optionally be reset any anytime (e.g., can be reset during the merge process).

Figure 6:
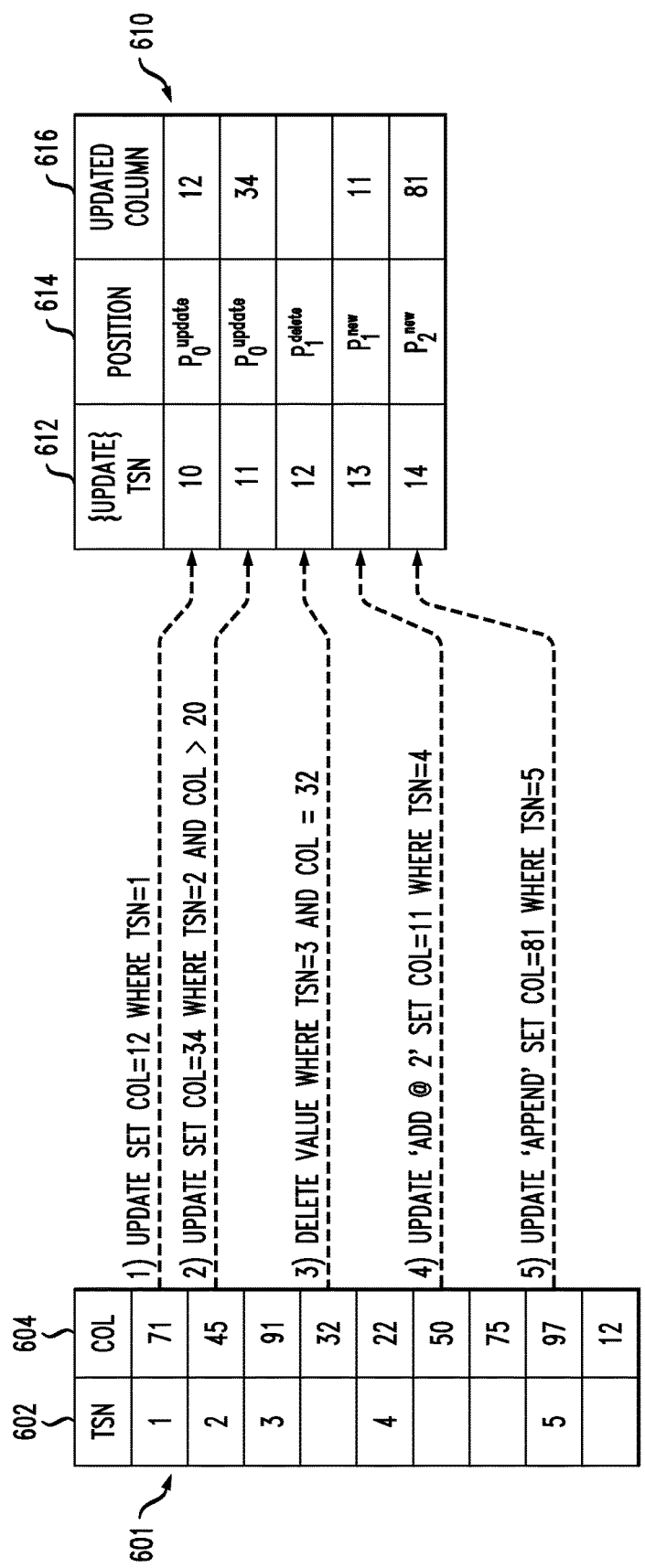
FIG. 6 shows an illustrative method of performing different operations using the append-only technique, according to an embodiment of the invention.

FIG. 6 shows an illustrative method of performing different operations using the append-only technique described above to derive table 520 of FIG. 5. As shown, the minimum that needs to be stored are the position of the value that is changed and the type of operation that was applied. Operations shown in the updates of FIG. 6 are identical to the ones in FIG. 5. Examples of changes to repeated value using append-only technique:
1) Single position update at position P.
2) Multiple positions update at positions $P_0$, $P_1$, $P_2$.
3) Remove a value in the list (or array) at position P.
4) Insert a new value to the list at position P.
5) Insert a new values to the end of the list.

Note that table 610 comprises an update TSN column 612, a position column 614 and an updated column 616 identical to those in table 520 of FIG. 5. Table 601 comprises a TSN column 602 and a value Column 604, table 601 represents the base page to which updates in table 610 are to be applied.

Figure 7:
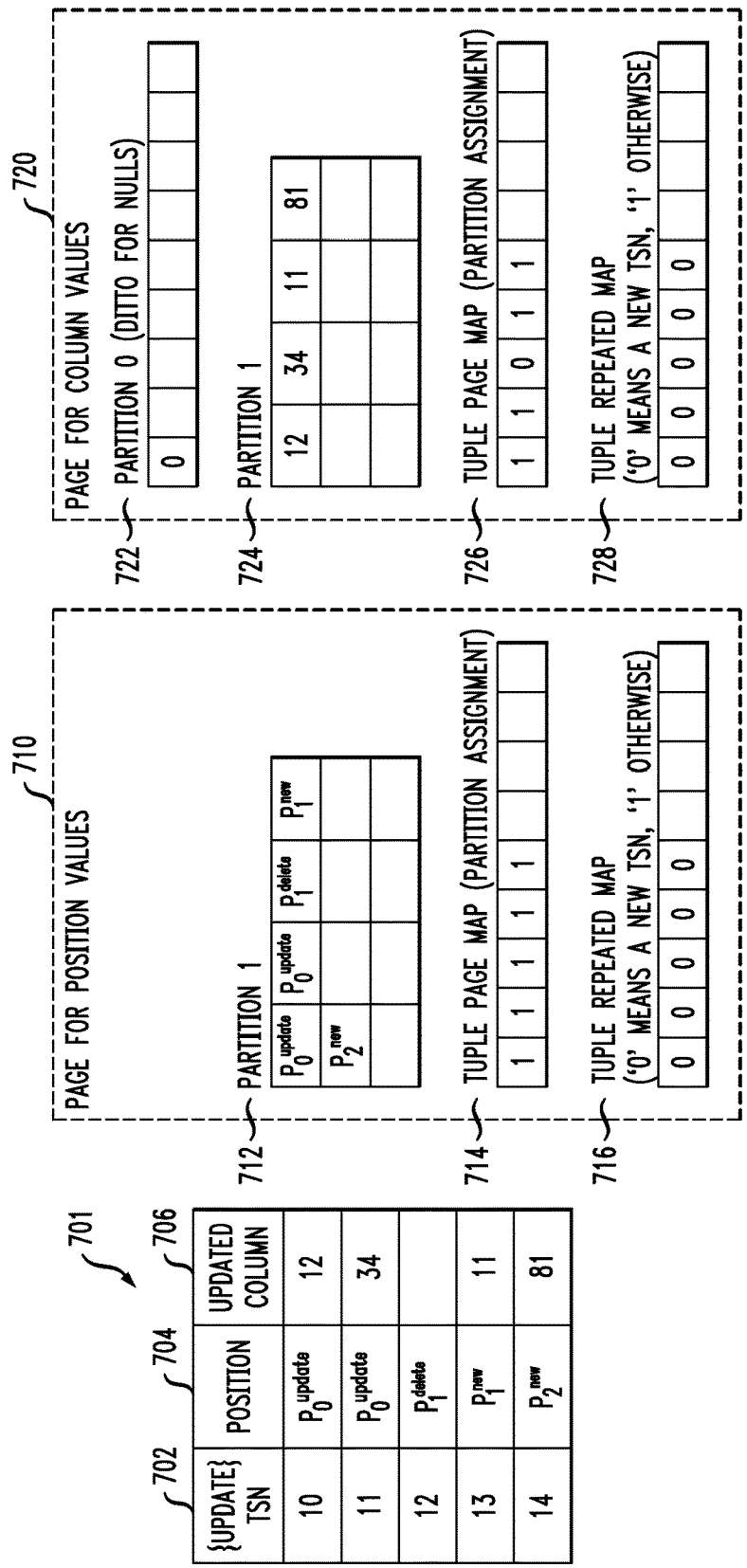
FIG. 7 shows an alternative embodiment of an in-page repeated map using an append-only technique.

FIG. 7 depicts an alternative embodiment of an in-page repeated map using an append-only technique. In this embodiment, there is a position column and an updated column. As the updated column could itself be repeated, the position could also be repeated. As such in this embodiment, there may be two different pages, one for position values (i.e., a page for position values 710) and one for column values (i.e., page for column values 720). A benefit of this embodiment being that changes to be made to the page layout are minimized. Table 701 is similar to table 520 of FIG. 5 and comprises an updates TSN column 702, a position column 704 and an updated column 706. The page for position values 710 comprises a partition 1 712, which includes position information similar to that stored in tuple position map 510 of FIG. 5. Each cell of partition 1 712 includes information on position of the record and a flag (e.g., new insertion, update, delete) for the record. The page for position values 710 also includes a tuple page map 714 and a tuple repeated map 716. The page for column values 720 comprises partition 0 (ditto partition) 722 for nulls, partition 1 724, tuple page map 726 and tuple repeated map 728. Note that partition 0 (ditto partition) 722, partition 1 724, tuple page map 726 and tuple repeated map 728 comprise information similar to those of partition 0 502, partition 1 504, tuple page map 506, tuple repeated map 508 of FIG. 5.

Figure 8:
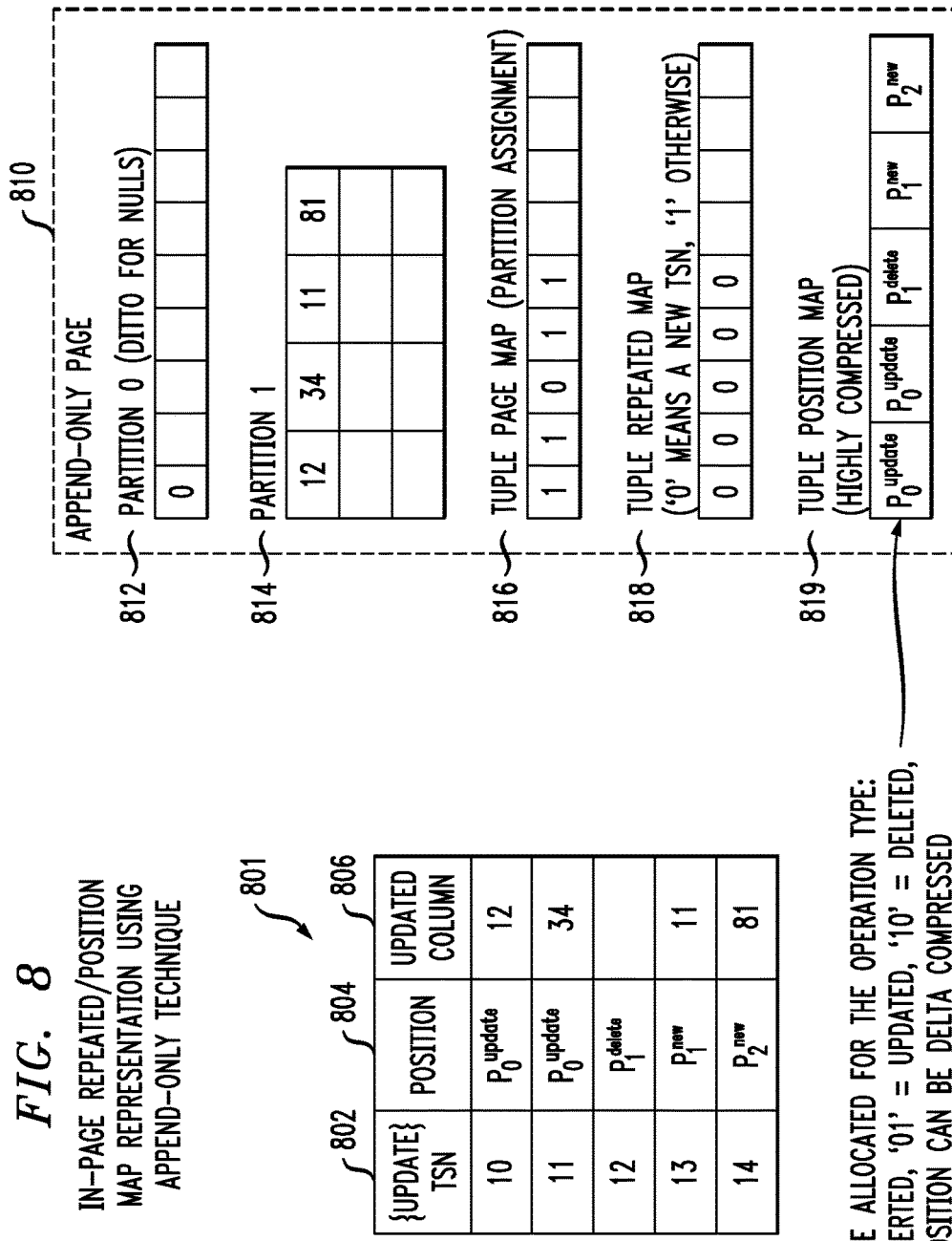
FIG. 8 shows an illustrative embodiment of a single page representation of the in-page repeated map of FIG. 7.

FIG. 8 is an illustrative embodiment of an in-page repeated/position map, which is a single page representation of the in-page repeated map shown in FIG. 7. Table 801 comprises an updates TSN column 802, a position column 804 and an updated column 806. Instead of the two separate pages for column values and position values shown in FIG. 7, the embodiment shown in FIG. 8 comprises an append-only page 810 that includes a partition 0 (ditto partition) 812 for nulls, partition 1 814, tuple page map 816, tuple repeated map 818 and a tuple position map 819. Note that in FIG. 7, the additional tuple position map 819 is not used, so there are less changes being made to the overall page layout. As changes to the page layout could be one of the most expensive types of changes one can do into a database because it may affect everything involved in it, an embodiment such as that shown in FIG. 7 might be advantageous to some users.

Figure 9:
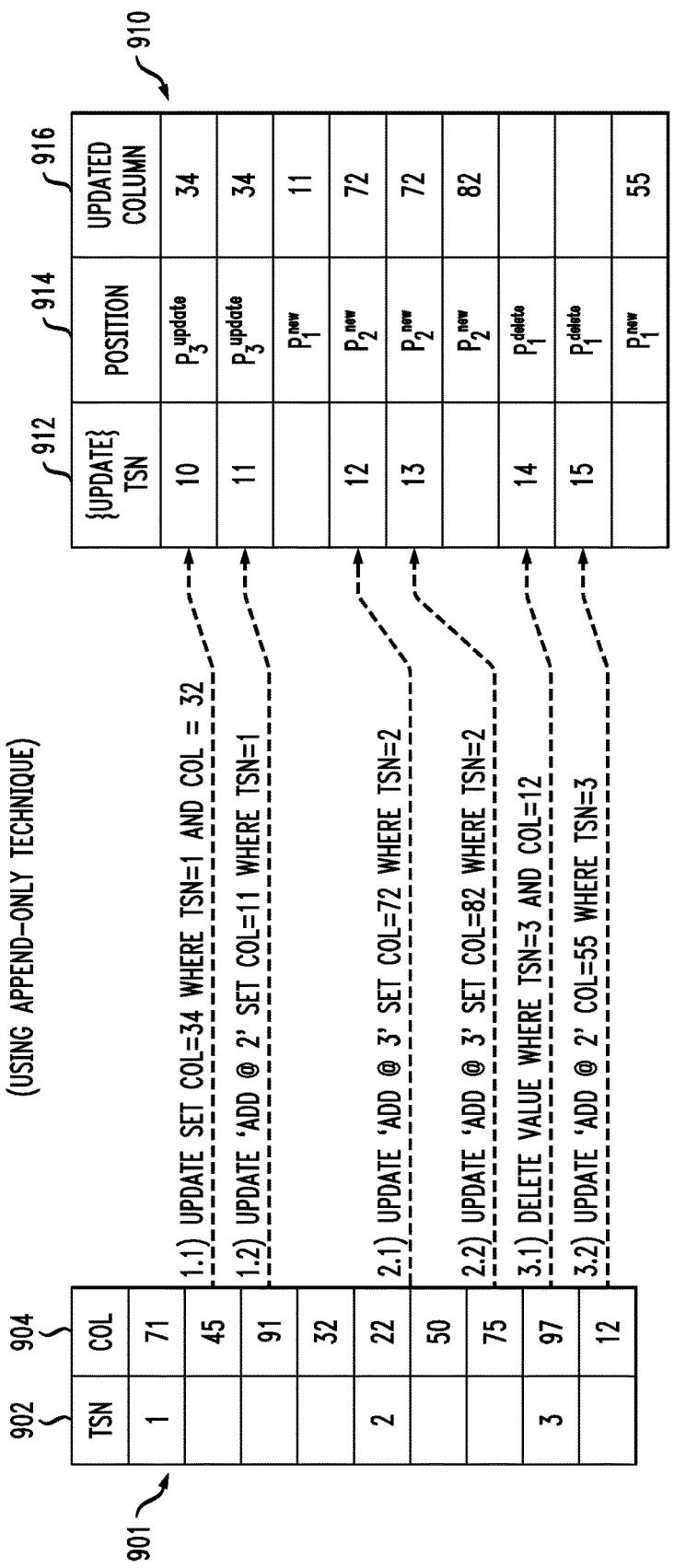
FIG. 9 shows an illustrative example of taking into account cumulative changes to repeated values using an append-only technique.

FIG. 9 shows an illustrative example of taking into account cumulative changes to repeated values using an append-only technique, according to an embodiment of the invention. Examples of cumulative changes may include a single position update at position P followed by inserting a new value at an earlier position, multiple insert operation to the same position, and delete followed by an insert to the same position.

Table 901 comprises a TSN column 902 and a value Column 904, the table 901 may represent a base-page to which changes are to be applied. Table 910 comprises an update TSN column 912, a position column 914 and an updated column 916. Examples of repeated positions include TSN 11, the updates of which changes multiple elements, therefore the position itself is getting repeated. As another example, there are multiple elements being changed at TSN 13, and both the updated column and position could also become repeated. Furthermore, note that there is an accumulation of changes of the repeated values. For example, at TSN 10, having position $P_3^{update}$ and update column value 34, which indicates an update of the value at position 3 to value 34. Note that in table 901, Column 904 starts at position 0, so $P_3$ actually corresponds position 4 of table 901, which has value 32, and that value is updated to 34.

Subsequently, to make an additional update to this row, as shown at TSN 11, having position $P_1^{new}$ and update column value 11 (which means the update is to add a new value in position 1 and make that value 11), information from the previous update at TSN 10 is carried over as shown by TSN 11 having two rows in table 910. Accordingly, the updates are made cumulative, which ensures that the latest set of changes are compiled for every record. In this example, the updates are performed consecutively right after one another, but in other instances there could have been many updates in between these two updates to the same record. As such, making the updates cumulative ensures that one can get the latest value for every record by looking at the append-only page and the base page, that is, one is able to see some or all of the changes that have been applied to the record so far. This accumulation can be reset, but at least for a period of time until a reset, this accumulation goes on accumulating values.

Illustratively, update 2.1, which may be a query request 301, indicates an update to add column value 72 at position 3 where TSN is 2, meaning that for TSN 2 in table 901, a new element having a value of 72 is to be inserted at position 3. Prior to the update, TSN 2 has Column values 22, 50, and 75. Then, at time TSN 12, the column values associated with TSN 2 would be 22, 50, 75, and 72. Subsequently, another query request 301 may be received as update 2.2 to add column value 82 at position 3 where TSN is 2. So at time TSN 13, the column values associated with TSN 2 would be 22, 50, 75, 82, and 72. As the changes are cumulative, one can obtain the latest values by looking at information in the append-only page (e.g., table 910) and information in the base page (e.g., table 901).

Notably, a single operation can also cause accumulations as well. For example, if a query 301 indicates that for multiple repeated values of value "2", change all the value "2" to value "4", then in the tail page (i.e., append-only page), for every position have a value of 2, an indication would be made to change the value 2 to 4 (e.g., position would be $P_2^{update}$ with column value 4, position $P_5^{update}$ with column value 4, etc.).

In various embodiments of the embodiment, cumulative changes may be handled as follows: 1) changes are accumulated in the exact same order as issued by update/insert/delete operations; 2) several optimizations are possible to reduce the size of accumulation such as when accumulating changes, only the latest update for each position is required, e.g., if $P_i^{update}$ is followed by $P_j^{update}$, where i and j refer to the same position, then only the latter update is kept; and 3) when accumulating changes, insertion of new entry followed by deleting the same entry will cancel each other, e.g., if $P_i^{insert}$ is followed by $P_i^{delete}$, then neither will be included in the accumulation.

Figure 10:
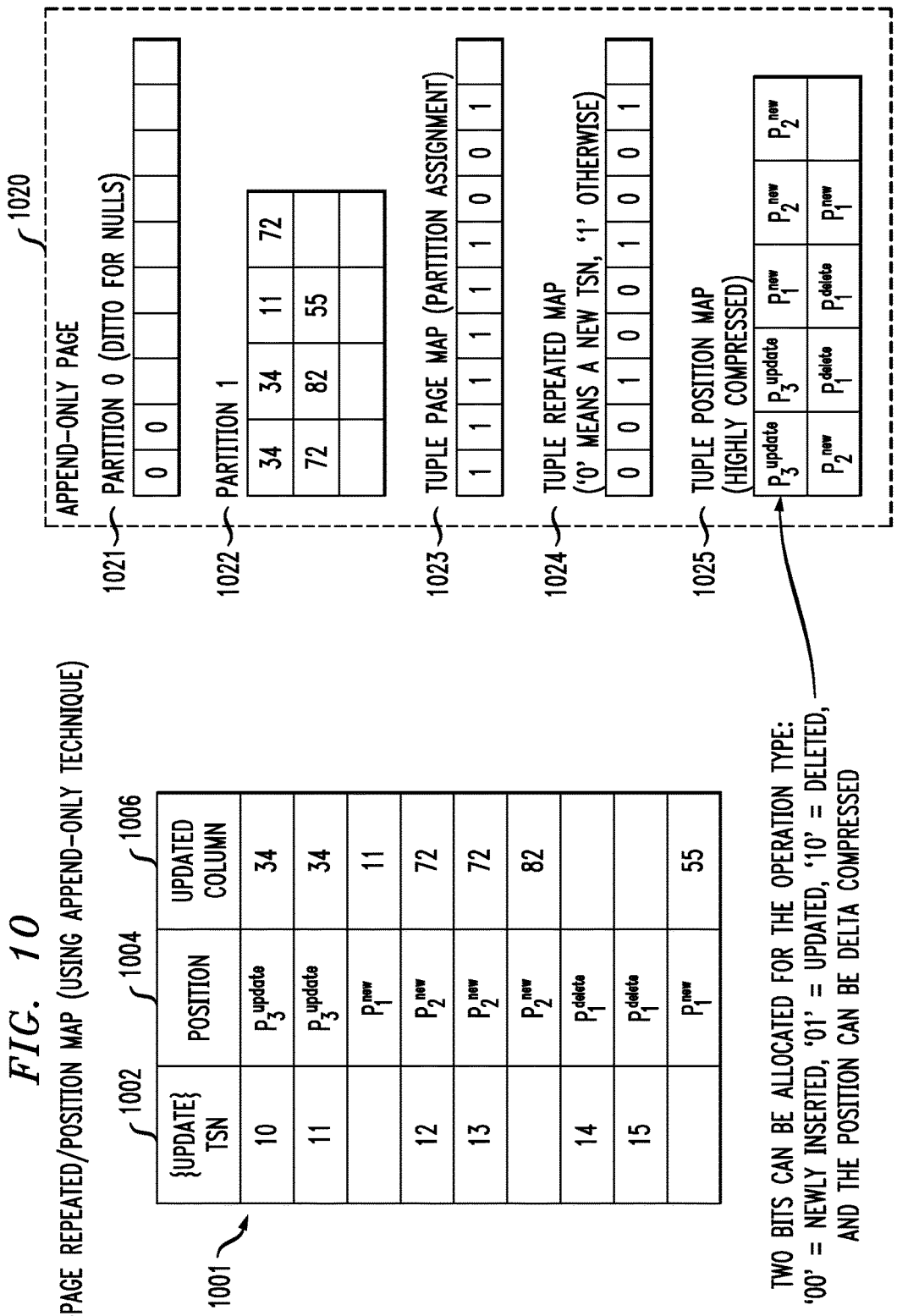
FIG. 10 shows an in-page repeated map of operations performed in FIG. 9 using an append-only technique, according to an embodiment of the invention.

FIG. 10 shows an in-page repeated/position map of the operations performed in FIG. 9 using an append-only technique, according to an embodiment of the invention. Accordingly, table 1001 comprises information similar to that in table 910 of FIG. 9. Table 1001 comprises an update TSN column 1002, a position column 1004 and an updated column 1006. Append only page 1020 comprises a partition 0 (ditto partition) 1021 for nulls, partition 1 1022, tuple page map 1023, tuple repeated map 1024 and a tuple position map 1025. Operations in the tuple position map 1025 may also be represented using two bits in each position (e.g., "00"=newly inserted, "01"=updates, "10"=deleted) instead of the flags (e.g., update, new, deleted).

The tables and pages shown herein (e.g., append-only column page and tables associated therewith) may be sent as output for display on a user device, and/or used by one or more other applications in one or more of the processing nodes 202-1 . . . 202-N. The output may also be stored in one or more databases, such as database 310 and/or within a memory, such as memory 214.

It is to be noted that while embodiments described herein show certain information as being represented by integers (e.g., zeros and ones in tuple page map and tuple repeated map), other suitable characters, symbols and/or text may also be used in alternative embodiments. Furthermore, while the tables and pages of embodiments described herein are shown in certain configurations, other configurations and/or arrangements may also be used in various alternative embodiments.

Various embodiments of the invention also provide support for varchar by modeling varchar as a set of repeated values (e.g., an ordered list), where each repeated value has a fixed size. Accordingly, updates translate to changing the affected fixed-size values and increasing the size of varchar translates to appending the ordered list.

Various embodiments also provide methods for adding columns. In these embodiments, a new column is added to an append-only page; the changes are reflected in the schema encoding of the append-only pages for all the subsequent updates after the new column is added. Adding a new column is similar to updating a column for the first time for a given TSN range. During the merge, the new column is materialized only for the updated range of TSN. As such, read-only pages are not affected. Instead of changing the base page when adding a new column, a new column is only added in the append-only pages. At a certain point in the merge process, augment original data may then be augmented with the new column. In this a way, the changes of adding the column into the database are minimized and it only affects the columns that have been updated.

Accordingly, various embodiments of the invention allow for a flexible schema using an in-page repeated/position map technique that supports:

repeated values for ordered and unordered lists (as required by JSON);
efficient varchar representation as a repeated values of fixed size;
nested data by flattening;
accessing data with at most two hops (the anchored record plus the append-only record);
value indexing using traditional indexes, no position indexing is needed as positions are implicitly maintained for fast access;
record-level version chaining to reduce space overhead;
storing repeated values without assigning a new TSN to avoid redundantly storing columns such schema-encoding, timestamp, indirection, etc.; and adding/removing columns by applying schema change to the future data via append-only pages.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention. For example, computer system/server 208 may comprise a computer program product for implementing embodiments of the invention disclosed herein.

The computer readable storage medium (e.g., memory 214) can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network (e.g., network 220), including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising steps of:
partitioning data within a database into one or more sets of read-only data pages and one or more sets of append-only data pages, wherein each set of read-only data pages is associated to one of the one or more sets of append-only data pages, wherein at least some of the append-only data pages include one or more changes to associated read-only data pages;
maintaining a repeated map for at least one of the one or more sets of append-only data pages;
maintaining an operational position map for at least one of the one or more sets of append-only data pages;
receiving a request to update one or more records in a given set of read-only data pages, wherein at least one of the one or more records comprises repeated values;
updating the repeated map and operational position map of the append-only data pages with the given set of read-only data pages in response to the request; and
automatically merging the one or more sets of append-only data pages with their respective set of read-only data pages on a periodic basis to create one or more new sets of read-only data pages, wherein the one or more changes in the at least some of the append-only data pages are applied to the associated read-only data pages;
wherein the steps are performed by at least one processor device coupled to a memory.

2. The method of claim 1, wherein the request to update one or more records comprises at least one of inserting a new record at a specific position, deleting one or more records, and updating one or more values of the one or more records.

3. The method of claim 1, wherein the repeated values comprises one of ordered repeated values and unordered repeated values.

4. The method of claim 1, wherein the repeated map is maintained for each of the one or more append-only data pages comprising the one or more records comprising repeated values.

5. The method of claim 4, wherein the repeated map comprises information distinguishing a new record from a repeated value associated with an immediately preceding record.

6. The method of claim 5, wherein the updating step comprises updating information of the repeated map based on the requested update to the one or more records.

7. The method of claim 1, wherein the repeated map is embedded within the append-only data pages.

8. The method of claim 1, wherein the operational position map comprises information identifying a position of the given record to be updated and an update to be made to the given record.

9. The method of claim 8, wherein the information further identifies one or more positions and one or more operations applied to at least one of the repeated values.

10. The method of claim 9, wherein the operational position map is maintained in a page separate from a page comprising column values of the one or more records.

11. The method of claim 9, wherein the operational map is maintained in the same page with column values of the one or more records.

12. The method of claim 9, wherein the updating step comprises updating the information of the operational position map based on the requested update to the one or more records.

13. The method of claim 1, further comprising partitioning column values of the one or more records based on bit size of column values.

14. The method of claim 13, further comprising maintaining a page map for at least one of the one or more sets of append-only data pages, the page map comprising partition location information for the column values of the one or more records.

15. The method of claim 14, further comprising updating the partition location information of the page map based on the requested update to the one or more records.

16. The method of claim 1, wherein the merging step comprises discarding one or more operational position maps such that the one or more new sets of read-only data pages comprises one or more repeated maps.

17. The method of claim 1, further comprising consulting the one or more new sets of read-only data pages in response to a query.

18. The method of claim 1, wherein at least one of the one or more records comprises at least one variable size column represented as one or more sets of fixed size repeated values.

19. A device comprising:
a memory and a processor operatively coupled to the memory and configured to implement the steps of:
partitioning data within a database into one or more sets of read-only data pages and one or more sets of append-only data pages, wherein each set of read-only data pages is associated to one of the one or more sets of append-only data pages, wherein at least some of the append-only data pages include one or more changes to associated read-only data pages;
maintaining a repeated map for at least one of the one or more sets of append-only data pages;
maintaining an operational position map for at least one of the one or more sets of append-only data pages;
receiving a request to update one or more records in a given set of read-only data pages, wherein at least one of the one or more records comprises repeated values;
updating the repeated map and operational position map of the append-only pages associated with the given set of read-only data pages in response to the request; and
automatically merging the one or more sets of append-only data pages with their respective set of read-only data pages on a periodic basis to create one or more new sets of read-only data pages wherein the one or more changes in the at least some of the append-only data pages are applied to the associated read-only data pages.

20. A computer program product comprising a computer readable storage medium for storing computer readable program code which, when executed, causes a computer to:

partition data within a database into one or more sets of read-only data pages and one or more sets of append-only data pages, wherein each set of read-only data pages is associated to one of the one or more sets of append-only data pages, wherein at least some of the append-only data pages include one or more changes to associated read-only data pages;

maintain a repeated map for at least one of the one or more sets of append-only data pages;

maintain an operational position map for at least one of the one or more sets of append-only data pages;

receive a request to update one or more records in a given set of read-only data pages, wherein at least one of the one or more records comprises repeated values;

update the repeated map and operational position map of the append-only data pages associated with the given set of read-only data pages in response to the request; and automatically merge the one or more sets of append-only data pages with their respective set of read-only data pages on a periodic basis to create one or more new sets of read-only data pages wherein the one or more changes in the at least some of the append-only data pages are applied to the associated read-only data pages.

* * * * *